I. M. BAUM.
PIPE.
APPLICATION FILED SEPT. 22, 1917.
1,325,612.  Patented Dec. 23, 1919.
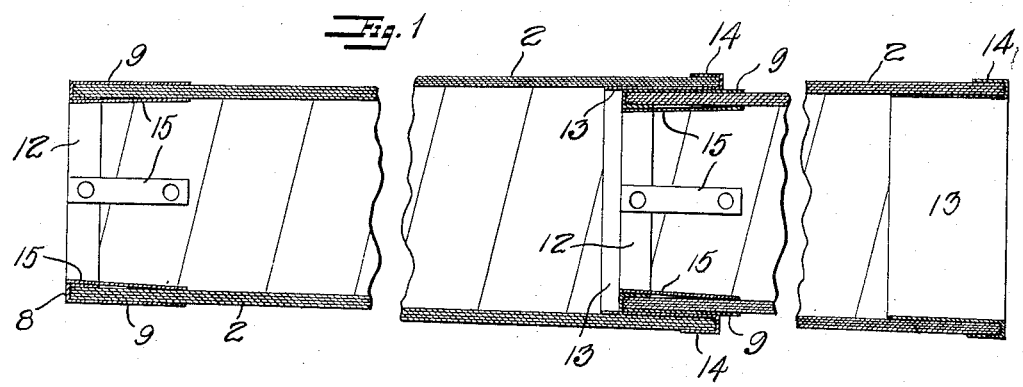
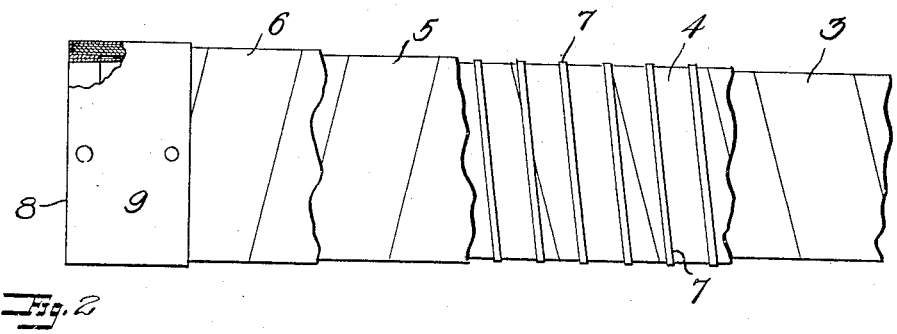
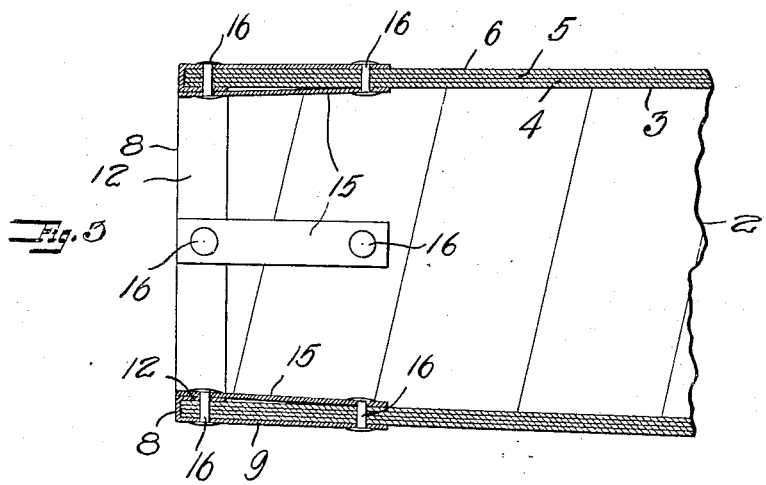
WITNESS
J. B. Gardner
INVENTOR
I. M. BAUM
By White & Frost
ATTORNEYS

UNITED STATES PATENT OFFICE.

ISAAC M. BAUM, OF SAN FRANCISCO, CALIFORNIA, ASSIGNOR, BY MESNE ASSIGNMENTS, TO THE PARAFFINE COMPANIES, INC., OF SAN FRANCISCO, CALIFORNIA, A CORPORATION OF CALIFORNIA.

PIPE.

1,325,612.   Specification of Letters Patent.   Patented Dec. 23, 1919.

Application filed September 22, 1917. Serial No. 192,698.

*To all whom it may concern:*

Be it known that I, ISAAC M. BAUM, a citizen of the United States, and a resident of the city and county of San Francisco and State of California, have invented certain new and useful Improvements in Pipes, of which the following is a specification.

The invention relates to pipe for the conveyance of liquids and particularly to waterproof paper pipe.

An object of the invention is to provide a waterproof paper pipe made in sections which are readily fitted together to form a continuous conduit of any desired length.

Another object of the invention is to provide means on the ends of the pipe sections for strengthening the ends and for joining the sections together.

The invention possesses other advantageous features, some of which, with the foregoing, will be set forth at length in the following description where I shall outline in full, that form of the invention which I have selected for illustration in the drawings accompanying and forming part of the present specification. In said drawings, I have shown one form of the pipe of my invention, but it is to be understood that I do not limit myself to such form, since the invention as expressed in the claims may be embodied in a plurality of forms.

Referring to said drawings:

Figure 1 is a longitudinal section of two sections of pipe joined together.

Fig. 2 is an elevation of one form of pipe of my invention, parts thereof being broken away to disclose the construction.

Fig. 3 is a longitudinal section through one end of the pipe section.

The pipe of my invention is particularly adapted to be used for irrigation purposes for conveying water to different areas to be irrigated. Pipe of this nature lies on the surface of the ground and is so made that sections may be readily added or removed to vary the length of the pipe while the water is flowing therethrough. The pipe of my invention is preferably formed of spirally-wound paper tube 2, suitably waterproofed. I prefer to make the pipe of four layers of spirally-wound paper, the two inner layers 3—4 being disposed in overlapping relation and wound in one direction, and the two outer layers 5—6 being disposed in overlapping relation and wound in the opposite direction, all of the layers being secured together by a waterproof adhesive. In order to strengthen the pipe against internal and external pressures, I provide a metallic reinforcement preferably arranged between the second and third layers. This reinforcement may assume any desired form, and in the drawings I have shown a metallic band or ribbon 7 wound tightly and spirally around the second paper layer.

The pipe is formed on a slightly tapered mandrel, so that it is larger on one end than on the other and the ends are of such size that the small end of one pipe section may be fitted tightly into the large end of another section. The ends of the pipe sections are reinforced and are provided with telescoping couplings, so that the sections may be readily coupled and uncoupled. Fitted on the ends of each pipe section are sheet metal annular thimbles or shoes which cover both the inside and outside surfaces of the section adjacent the ends. The thimble 8 on the small end of the section is preferably provided with a long outside skirt 9 and a short inside skirt 12, whereas the thimble on the large end is preferably provided with a long inside skirt 13 and a short outside skirt 14. Thimbles of this shape may be readily rolled or pressed from sheet metal and slipped over the ends and secured to the sections. In fitting the sections together, the long outside skirt 9 contacts with the long inside skirt 13, providing contacting surfaces of large area and producing a satisfactory joint. The thimbles may be held on the sections by rivets extending through the paper and when such construction is employed I prefer to use metallic reinforcing strips 15 on that side of the thimble which has a short skirt. The strips extend longitudinally of the pipe section and extend inward from the end, for substantially the length of the long skirt. Rivets 16 are then passed through the long skirt and the strips at opposite ends thereof, securely fastening the thimbles in place. At the small end of the pipe the strips are disposed on the inside of the pipe and at the large end, on the outside of the pipe.

The pipe thus produced furnishes a liquid conduit which is cheap, durable and efficient and which can be readily lengthened or shortened during the time that water is flowing therethrough. The thimbles not only provide couplings for securing the pipe sections together, but reinforce and protect the ends of the paper pipes, and the reinforcing material between the layers of the spirally-wound paper strengthens the pipe against collapse or bursting throughout its length.

I claim:

1. A pipe section comprising a spirally-wound paper tube and tapered annular thimbles on the ends of said tube, one skirt of said thimble being longer than the other.

2. A pipe section comprising a paper tube, an annular thimble on each end of said tube, the outer skirt of the thimble on the small end of the pipe and the inner skirt of the thimble on the large end of the pipe being relatively longer than the other skirt of said thimbles and the long skirt of the small end of said pipe being adapted to fit snugly into the long skirt on the large end of said pipe.

3. A pipe section comprising a paper tube and tapered annular thimbles on the ends of said tube, the thimble on the small end of said tube being adapted to fit snugly into the thimble on the large end of the tube.

4. A pipe section comprising a paper tube, a metallic shoe having a long skirt and a short skirt, fitted to the end of the tube, a metallic strip lying against that surface of the tube engaged by the short skirt, and fastening means extending through the long skirt, the tube and the strip.

5. A conduit for conveying liquid, comprising a plurality of tapered, spirally-wound paper pipe sections, reinforced throughout their length, a metallic shoe on each end of each section having a tapered skirt lying against the surface of the pipe, the skirt at one end of a section being adapted to tightly fit into the skirt on the end of the successive pipe section.

In testimony whereof I have hereunto set my hand at San Francisco, California, this 12th day of September, 1917.

ISAAC M. BAUM.

In presence of—
H. G. PROST.